Oct. 28, 1941.　　　E. R. BOOKER　　　2,260,827
CALCULATING MACHINE
Filed July 13, 1938　　　6 Sheets-Sheet 1

INVENTOR.
Eugene R. Booker.
BY
Chas. E. Townsend,
ATTORNEY.

Oct. 28, 1941.          E. R. BOOKER           2,260,827
                       CALCULATING MACHINE
                    Filed July 13, 1938        6 Sheets-Sheet 2

INVENTOR.
Eugene R. Booker.
BY
Chas. E. Townsend.
ATTORNEY

Oct. 28, 1941.  E. R. BOOKER  2,260,827
CALCULATING MACHINE
Filed July 13, 1938   6 Sheets-Sheet 3

INVENTOR.
Eugene R. Booker,
BY
Chas. E. Townsend
ATTORNEY.

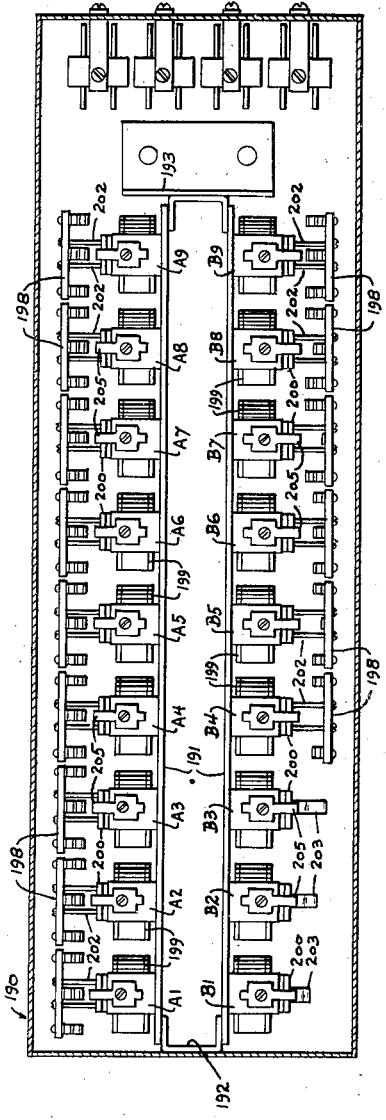
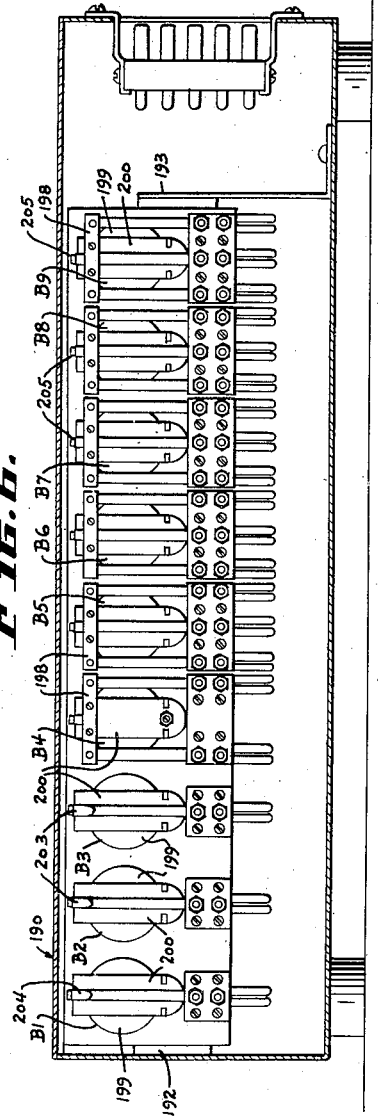

Oct. 28, 1941.  E. R. BOOKER  2,260,827
CALCULATING MACHINE
Filed July 13, 1938   6 Sheets-Sheet 5

INVENTOR.
Eugene R. Booker.
BY
Chas. E. Townsend.
ATTORNEY.

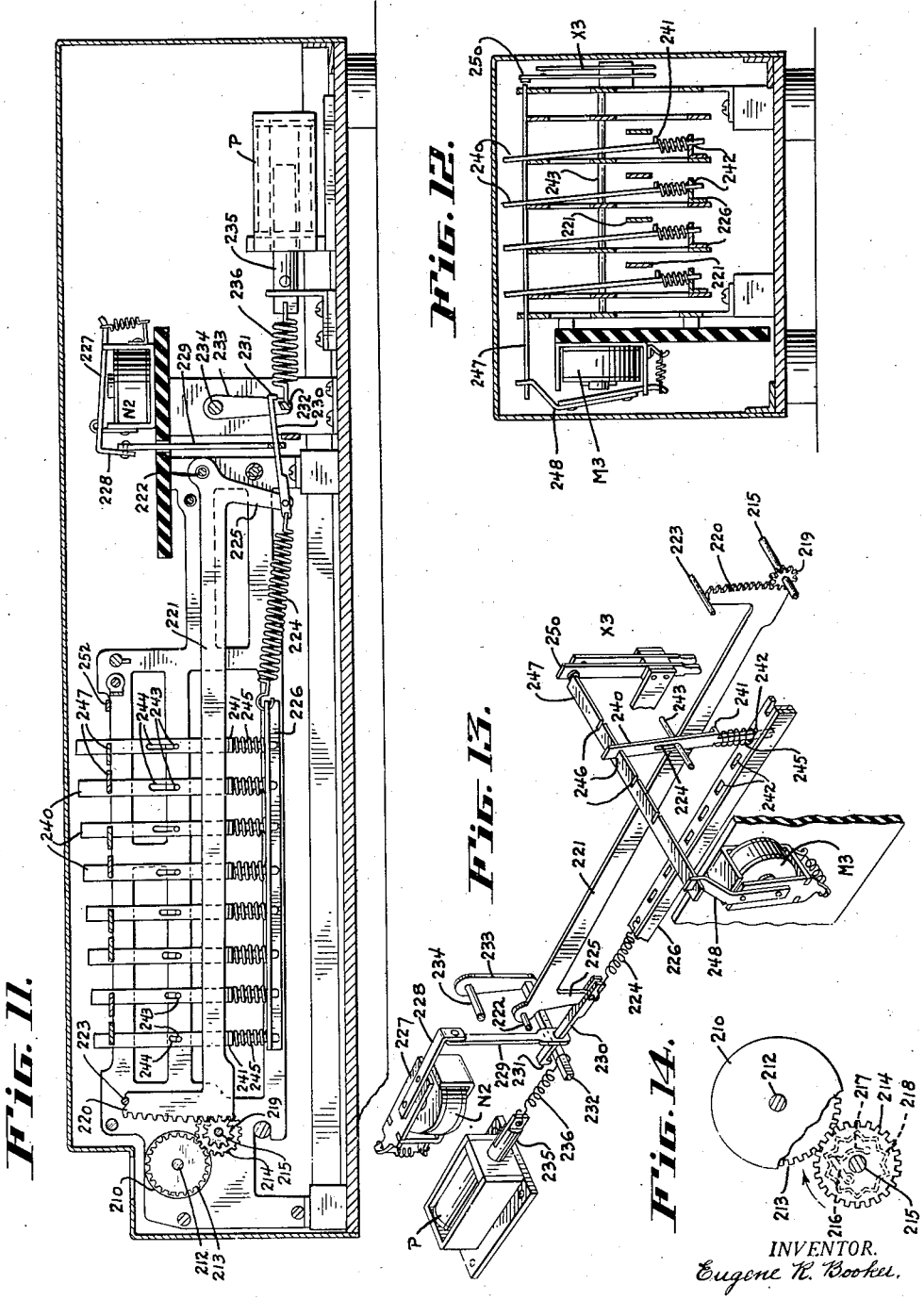

Patented Oct. 28, 1941

2,260,827

UNITED STATES PATENT OFFICE 2,260,827

CALCULATING MACHINE

Eugene R. Booker, San Jose, Calif.

Application July 13, 1938, Serial No. 218,985

2 Claims. (Cl. 235—61)

The present invention relates to calculating machines, and more particularly to machines adapted to accomplish multiplication through electric mechanical means in a manner similar to that disclosed in United States Letters Patent No. 1,870,705, issued to William Black, for "Calculating machine," on August 9, 1932.

It is the object of the present invention to provide a calculating machine for accomplishing multiplication employing the general principles of operation disclosed in the said patent to William Black, No. 1,870,705, but being an improvement over the disclosure of said patent in the use of certain simplified mechanisms and electrical circuits.

It is a further object of the invention to provide an improved keyboard and key switch structure for machines of this general type.

A still further object of the invention is the provision of an improved and simplified selector switch for use in such a calculating machine for the control successively of a multiplicity of operations, each of which operations controls a multiplicity of electrical circuits.

Another object of the invention is the provision of improved and simplified means for actuating a mechanical accumulator to effect registration thereby of a number which may be the product of numbers entered upon remotely positioned keyboards connected electrically with the accumulator.

The machine of the present invention employs two key banks, one of which is a multiplier key bank, and the other a multiplicand key bank. Each of these key banks comprises a multiplicity of like columns of keys, each of which columns consists of keys numbered from "1" through "9," inclusive. In the operation of multiplying two numbers on the machine, the keys of one key bank are depressed to correspond to one of the numbers, and the keys on the other key bank are depressed to correspond to the other of the numbers. A single rotation of an operating handle then supplies motive power to carry the machine through the complete series of operations necessary to register on a series of accumulator dials successively the partial product obtained when each digit in the multiplier is multiplied by each digit in the multiplicand.

For the purpose of illustrating the invention, the machine disclosed herein is shown as provided with two columns of keys in the multiplier key bank and two columns in the multiplicand key bank, and is thus capable of multiplying numbers of two digits only. It is to be understood, however, that this disclosure is simply for purposes of illustration, and that the described principle of operation and mechanical design disclosed may be extended to apply to a machine capable of operation with a multiplier and multiplicand of any desired number of digits. One form of the invention is illustrated in the accompanying drawings to which reference is made in the following specification, wherein further objects and advantages of the invention are made apparent.

In the drawings—

Fig. 5 is a plan view of the relay unit, the casing being shown in section, disclosing the interior mechanism;

Fig. 6 is a side elevation of the relay unit shown in Fig. 5;

Fig. 11 is a longitudinal section through the accumulator illustrating parts of the mechanical operating means of the accumulator and showing a single dial and mechanism associated therewith;

Fig. 12 is a transverse section through the accumulator showing the mechanism employed for determining the extent to which an accumulator dial may be turned;

Fig. 13 is a perspective view of a single accumulator dial operating mechanism and associated parts for controlling the operation of the dial; and Fig. 14 is a detailed view in side elevation of a dial and associated driving mechanism therefor.

Figure 3:
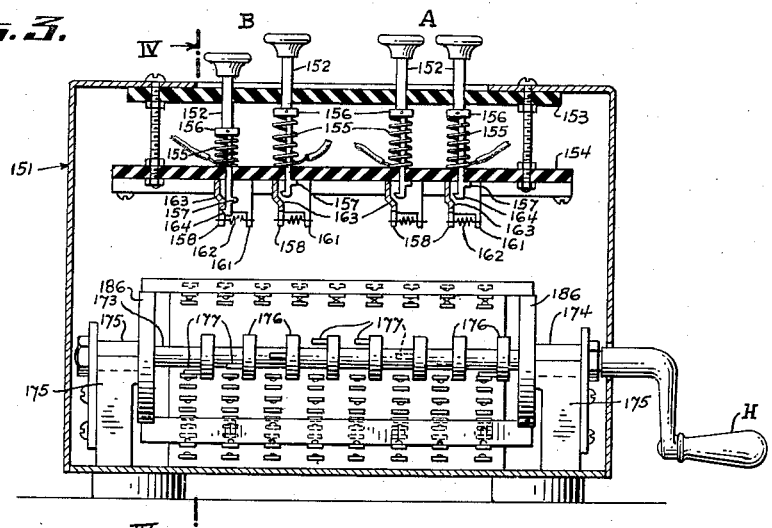
Fig. 3 is a front view of the control unit of a machine, the casing and key banks being shown in section.
Figure 4:
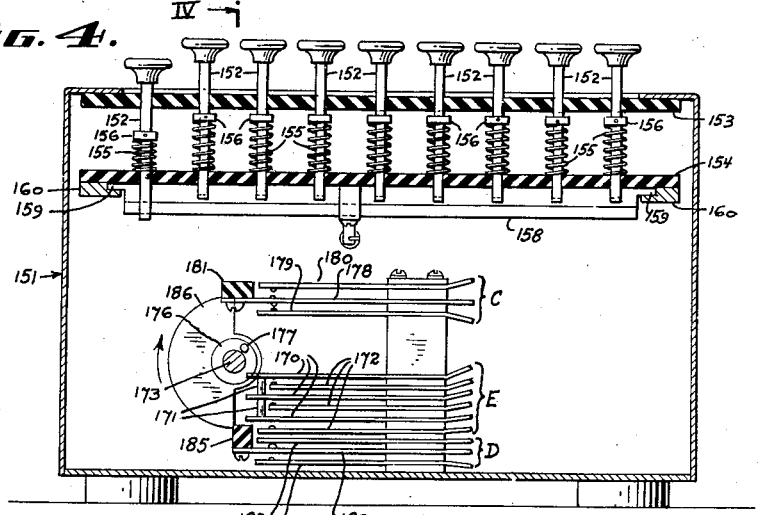
Fig. 4 is a sectional view of the control unit taken along line IV—IV of Fig. 3.

The machine of the present invention consists essentially of three units. The first, a control unit, is illustrated in Figs. 3 and 4, and the wiring diagram therefor is shown at the left-hand side of Fig. 1. The second, or relay unit, is illustrated in Figs. 5 and 6, and the wiring diagram for said unit is that shown in Fig. 2. The third unit, or accumulator unit, is that illustrated in Figs. 9 to 14, and the wiring diagram of said unit is shown at the right-hand side of Fig. 1.

Figure 9:
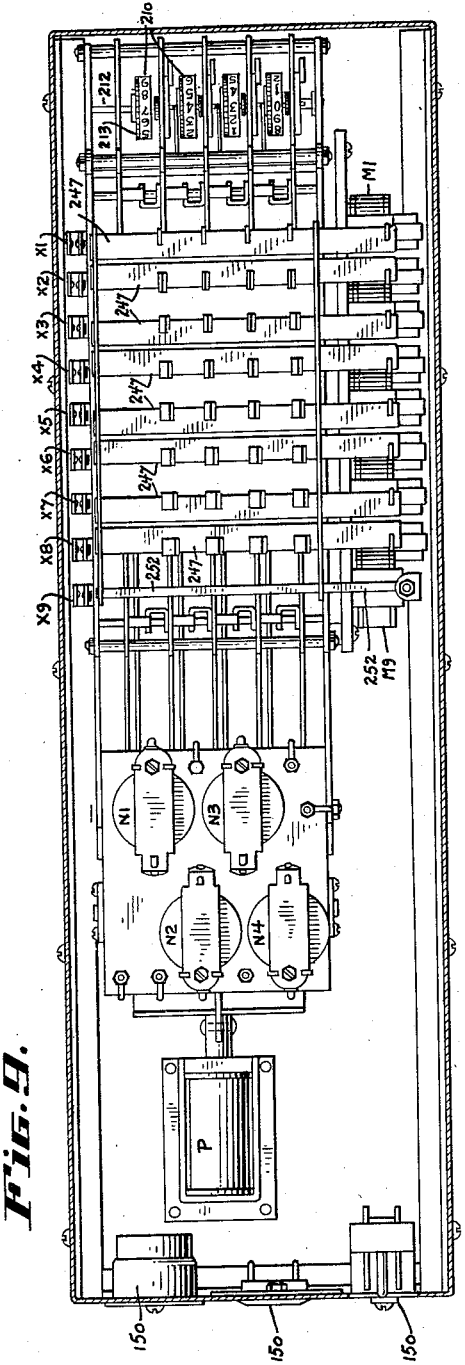
Fig. 9 is a plan view of the accumulator unit illustrating those parts of the machine which control electrically the actuation of the accumulator dials.
Figure 10:
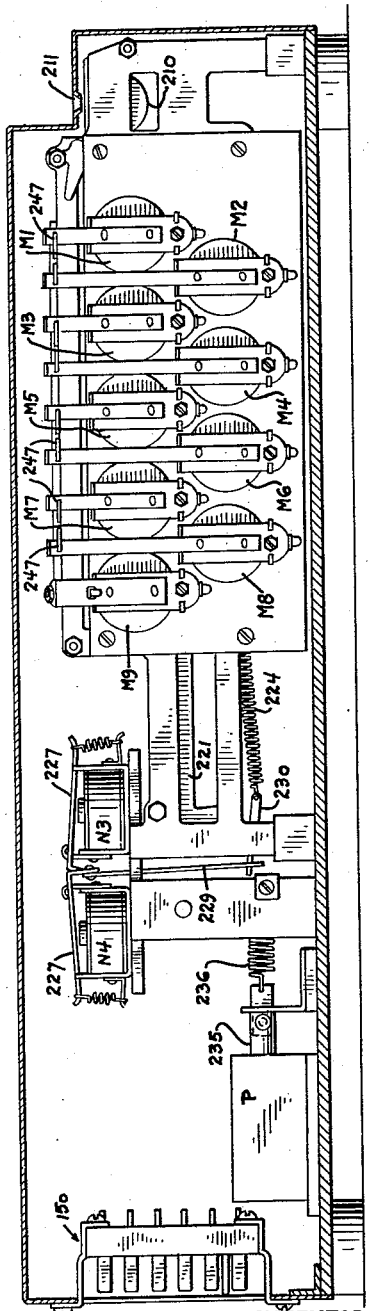
Fig. 10 is a side elevation of the mechanism illustrated in Fig. 9.

The three units may be housed separately and connected by suitable multiplier cables by means of plug sockets such as generally indicated at 150 in Figs. 9 and 10. The sockets are not essential, and may be dispensed with if the three units are to be permanently located, and thus they are not illustrated in the wiring diagram shown in Figs. 1 and 2. The control unit is placed within convenient reach of the operator, while the accumulator unit may be placed in any convenient position where the products registered therein may be easily read. The relay unit may be remotely located or placed in any position desired. It is of course to be understood that all three units may be built into a single housing, or that both the accumulator and relay units may be located at points remote from the operator and, if it is desirable, at points entirely remote from each other.

Control unit

Figure 1:
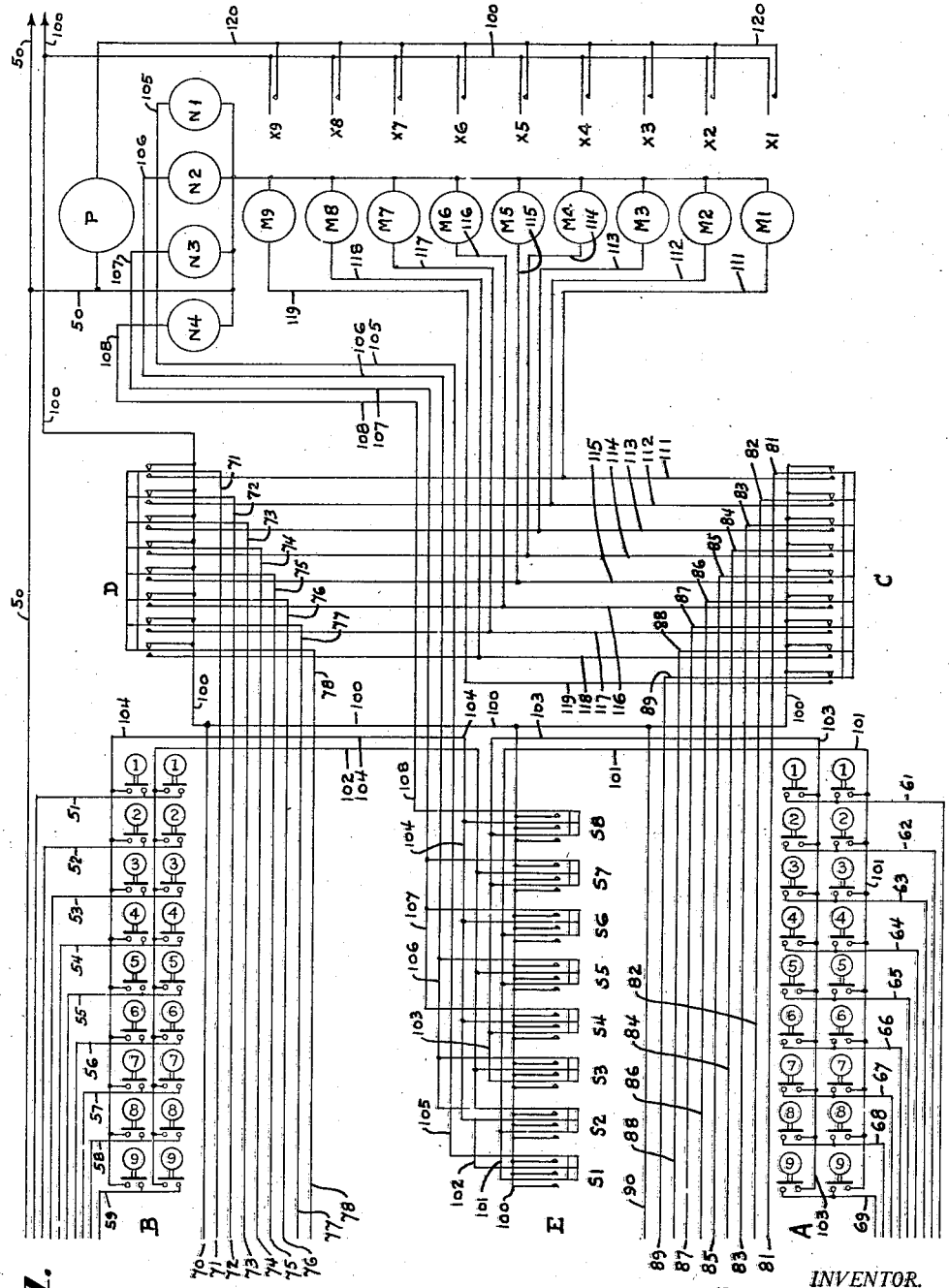
Fig. 1 is a wiring diagram of one portion of the machine.

The control unit, as illustrated in Figs. 3 and 4, and as diagrammatically shown at the left-hand side of Fig. 1, comprises a double keyboard, a selector switch and reversing switches all mounted within a suitable casing such as indicated at 151. The double keyboard consists of two identical key banks, an "A" key bank and a "B" key bank. Each of these key banks consists of a plurality of columns of keys, two columns for each key bank being shown in the present illustration, and the keys of each column being numbered from "1" to "9" consecutively. The suffix "A" will be used to designate keys in the "A" key bank, and the suffix "B" to designate the keys in the "B" key bank. Each of the keys, as illustrated in Figs. 3 and 4, is carried by a stem 152. These stems are supported for vertical reciprocal movement through guide plates 153 and 154, said guide plates being made of a dielectric material such as hard rubber, Bakelite or the like. Each key is held in a normal position at the top of its reciprocal stroke by a compression spring 155 interposed between a collar 156 and the guide plate 154. The upward movement of each key is limited by a lateral projection 157 on its stem which contacts the bottom of the guide plate 154 through which the stem passes.

In order to retain any one key in any of the columns in a depressed position, a bar 158 is positioned below each column of keys and is supported for swinging movement about an axis parallel with its upper longitudinal edge by extensions 159 at its ends which project into suitable recesses in bearing members 160 which extend transversely of the columns of keys at opposite ends thereof. Each of the bars 158 is normally held against a stop member 161 secured to and depending from the lower side of the guide plate 154 by a spring 162, as shown in Fig. 3. The bars 158 are offset along longitudinal lines to provide inclined shoulders 163 intermediate their edges when viewed in cross-section, as in Fig. 3, and the lower ends of the key stems 152 are provided each with a latch lug 164 so that, upon depression of any key, the bar 158 underlying the column in which the key is pressed is caused to swing against the tension of its spring 162 until the latch 164 passes its lower edge, at which time the bar returns to normal position and, by engagement with the latch 164 of the depressed key, retains that key in its depressed position. The bars 158 are metallic and therefore electrical conductors so that each bar, as will hereinafter be pointed out, serves as a part of a switch, the bar serving as one part of the switch and the key stems, which are also metal, serving in each column as the other side of nine selectively operable switches. The depression of a key, however, does not close a circuit, but simply serves to select a circuit later to be closed by mechanism also to be described hereinafter.

Referring to Fig. 1, the bars 158 are shown as connected to wires 101, 102, 103 and 104, and the key stems are connected to wires 51 to 59, respectively, for the "B" key bank, and 61 to 69, respectively, for the "A" key bank. Thus a connection may be established between any key wire and its corresponding bar 158, and wires 101, 102, 103 or 104 by depression of the key. The connection between the key stems and their respective wires may be made in any conventional manner, one suitable form of connection for this purpose being shown in Fig. 3 where wires are illustrated as soldered to the lowermost portion of the springs 155. Likewise, wires 101 to 104 may be secured to the bars 158 in any suitable position (not shown).

The selector switch and reversing switches which form a part of the control unit are shown in Figs. 3 and 4 and illustrated centrally of Fig. 1 at E, C and D, respectively. The selector switch E comprises eight multiple contact switches designated S—1 to S—8. Each of said multiple contact switches comprises three spring arms 170 (see Fig. 4) adapted to be flexed downwardly and interconnected at their ends by spacers 171, causing them to move downwardly together, and three relatively rigid arms 172 positioned one directly below each of the resilient arms 170 so that upon downward flexing of the arms 170 they contact all of the arms 172 simultaneously to close three separate circuits.

In order that the machine go through the eight essential operations to complete a product of multiplication of two-digit numbers, it is necessary that the switches S—1 to S—8 be successively and sequentially closed, and that no two of these switches be in closed position at the same time. In order to accomplish this closing of the switches S—1 to S—8, a shaft 173 is supported for rotation by a hand crank H in bearings 174 carried by brackets 175. Spaced along this shaft above and adjacent the switches S—1 to S—8 are collars 176, each of which carries a pin 177, the pins being so positioned that upon rotation of the shaft each of them will contact the uppermost of one of the resilient spring arms 170, depressing it to close the multiple switch of which it is a part. The pins 177 are positioned at circumferentially spaced intervals with respect to the shaft so that, upon a single complete rotation of the hand crank H, they effect successive closing of the switches S—1 to S—8, respectively, and the timing is such that each switch is closed and permitted to open again before the next successive switch is closed.

The reversing switches are illustrated at C and D. The reversing switch C is made up of nine simultaneously operating double-throw switches, each of which nine switches comprises a central flexible switch arm 178 and two relatively stationary spring arms 179 and 180 positioned above and below the flexible arm 178. The arms 178 of these switches are connected by a common transversely extending dielectric bar 181 and normally contact the arms 179. The reversing switch D comprises eight switches similar to those of the switch C, and each consists of a flexible spring arm 182 with a stationary arm 183 disposed above it and a stationary arm 184 disposed below it. The spring arms 182 are normally in contact with the upper arms 183 and are all connected by a common dielectric bar 185.

During the operation of the machine, it is required that the flexible switch arms 178 of the reversing switch C be moved from their position contacting the arms 179 to positions contacting the arms 180 during the first four operations of the selector switch. It is required likewise that the flexible arms 182 of the reversing switch D contact the arms 183 during the first four operations of the selector switch and then contact the arms 184 during the last four operations thereof. In order to accomplish this adjustment of the reversing switches, a pair of cam members 186, which are substantially semi-circular, are carried by the shaft 173, with which they are concentric, for engagement during rotation of said shaft with the bar 181, which controls the switch arms 178. The normal position of the cams 186 is illustrated in Fig. 4. The very tops of the cams, when they are in this position, are slightly flattened so that as the bar 181 rests upon them the switch arms 178 remain in contact with the arms 179. As the shaft 173 is rotated by means of the crank H, the cams 186 serve to lift the bar 181 upwardly, thus causing the switch arms 178 to leave the arms 179 and contact the arms 180. This position of the switches is maintained throughout one-half the cycle of the operation of the shaft 173, at which time the bar 181 drops from the cams 186 to its normal position, and the cams contact the bar 185, moving it downwardly to break the contact between switch arms 182 and 183 and establish contacts between switch arms 182 and 184 during the next half-cycle of operation. Through the mechanism just described, the reversing switches are caused to be in one position during the operation of the selector switches S—1, S—2, S—3, and S—4, and in the opposite position during the operation of the selector switches S—5, S—6, S—7 and S—8.

*Relay unit*

Figure 2:
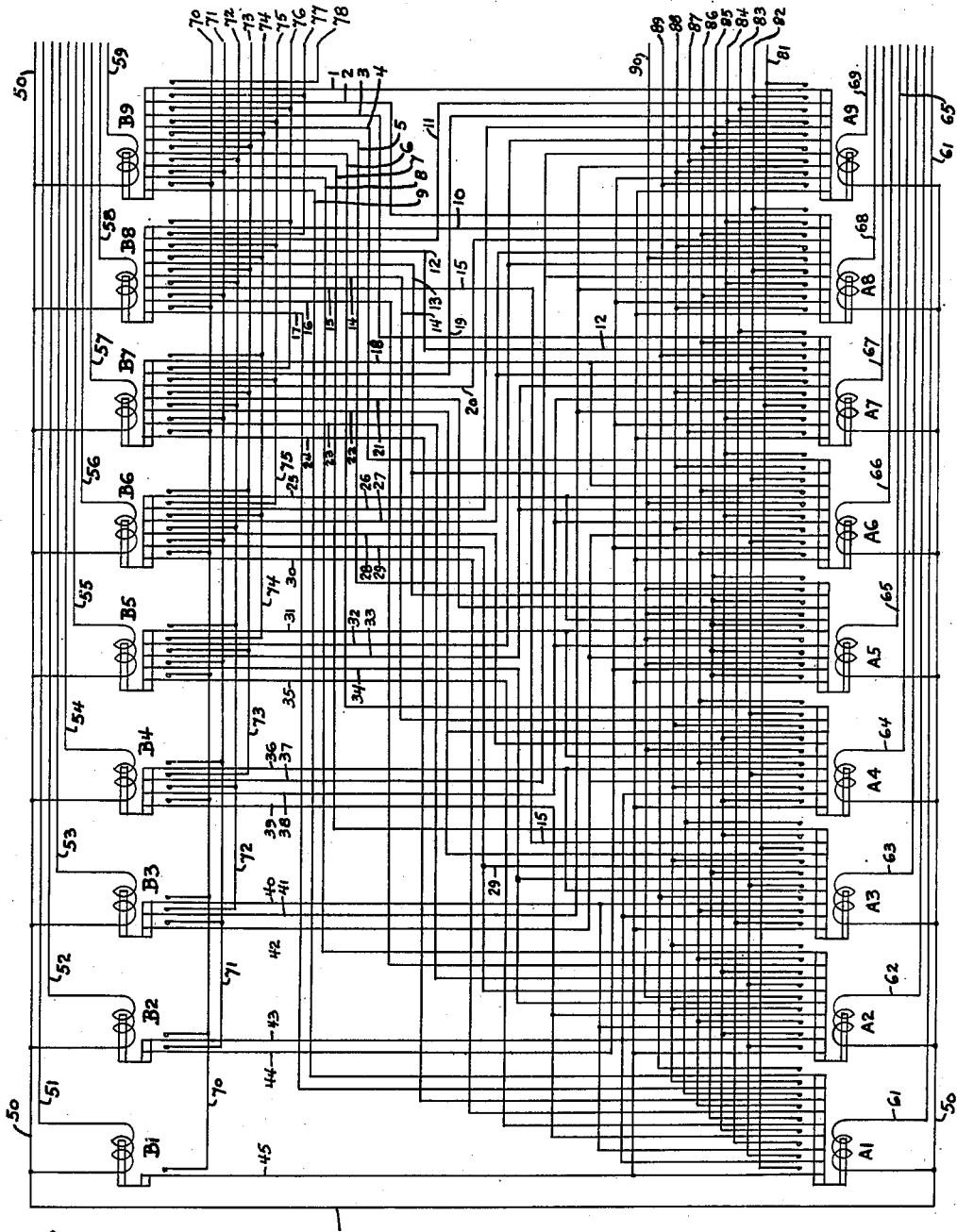
Fig. 2 is a wiring diagram which, when taken with Fig. 1, constitutes a complete wiring diagram of a machine embodying the present invention.

The relay unit is illustrated in Figs. 5 to 8, inclusive, and the wiring diagram therefor appears in Fig. 2. This unit comprises eighteen relays numbered A—1 to A—9 and B—1 to B—9, all mounted in a suitable casing such as indicated at 190 by means of a pair of bars 191 secured to brackets 192 and 193. Each of the relays A—1 to A—9, inclusive, and relay B—9 controls a group of nine single-pole single-throw switches. Relay B—8 controls a group of eight single-pole single-throw switches, while relays B—7, B—6, B—5, B—4, B—3, B—2, and B—1 similarly control respectively seven, six, five, four, three, two and one single-pole single-throw switches. Thus a total of one hundred and twenty-six switches are employed in the relay unit in the formation of the partial products obtained by multiplying any digit by any other digit. This represents a marked improvement over the prior art as, for example, in the patent to Black, referred to hereinabove, one hundred and sixty-two switches are required to accomplish this same result, while in other disclosures of the prior art where the number of switches is less than that of the present disclosure, the number of relays or electromagnets necessary for their operation greatly exceeds that of the present disclosure. Likewise, the number of wires necessary to interconnect these relay switches for the purpose of selecting circuits in the manner hereinafter to be described is considerably less in the present machine than in machines where a greater number of switches are employed.

Figure 7:
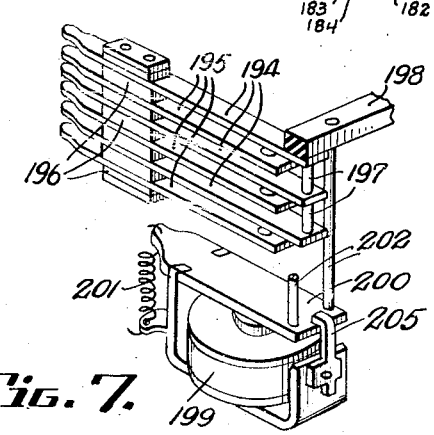
Fig. 7 is a perspective view with parts broken away of a single multi-contact relay switch of the type illustrated in Figs. 5 and 6.
Figure 8:
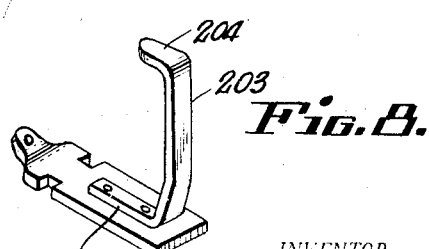
Fig. 8 is a perspective view of a modified form of armature used in some of the switches illustrated in Fig 7.

Details of structure of the relays A—1 to A—9 and B—1 to B—9 are illustrated in Figs. 7 and 8. The single-pole single-throw switches referred to as being controlled by the relays are arranged in groups, one such group being shown in Fig. 7 as comprising three flexible switch arms 194 with which are interposed three relatively stationary switch arms 195. Spacing blocks 196 serve to mount and maintain all of these arms in normally separated positions, and spacers 197 are interposed between the outer ends of the arms 194 which are slightly longer than the arms 195 to connect these flexible arms for simultaneous movement so that they will move downwardly together simultaneously to contact and complete an electric circuit through the arms 195. Where nine switches are employed as, for example, in the relays A—1 to A—9 and B—9, three such groups of switches are employed and connected together in each case by a bar 198 of nonconducting material extending across the outer ends of the three outermost flexible arms 194 so that, upon inward movement of the bar 198, all nine switches of the three groups will be simultaneously closed.

An electromagnet 199 controls each of the groups of relay switches. A pivoted armature 200 on each electromagnet is normally held away from the magnet by a contractile spring 201 engaging one end of the armature, and at the other end of the armature, bolts 202 connect it with the bar 198. Consequently, upon energization of the electromagnet 199, the armature 200, drawn toward the magnet against the tension of the spring 201, will effect closing of all switches under control of the bar 198 through the bolts 202 and bar 198. The movement of the armature 200, under the influence of the spring 201, is limited by a stop lug 205 which is secured by means of a screw, as shown, to the bracket which supports the electromagnets 199. While there are three groups of three switches each for relays A—1 to A—9 and B—9, relay B—8 has one switch eliminated, relay B—7 has two switches eliminated, and so on, as clearly illustrated in Fig. 5. The bars 198 are employed for all of the relays with the exception of B—1, B—2 and B—3, which have but one, two and three switches, respectively, and consequently require only a single group of switches. In order to actuate these single groups of switches, a simplified structure is used in place of the bar 198, this structure being illustrated in Fig. 8 wherein the armature 200 is shown as provided with an outwardly extending bracket 203 having its outer end bent at right angles, as illustrated at 204, to contact the switch group instead of the bar 198, which is necessary only where it is desired to contact more than one group of switches simultaneously.

Accumulator

The accumulator unit, details of which are illustrated in Figs. 9 to 14 of the drawings, includes a set of numbered dials generally indicated at 210, as illustrated in Fig. 9, the numbers of which display the results of operation of the machine through sight openings 211 formed in the casing of the accumulator unit directly above the accumulator dials, as shown in Fig. 10. It is the function of this unit to effect rotation of these dials depending upon the particular problem of multiplication introduced into the machine by selecting for each partial operation of the machine the proper dial, that is, the units, tens, hundreds or thousands dial, and rotating said dial through a distance that is determined and limited by the values of the multiplier and multiplicand set up on the key banks of the machine.

In Fig. 14, one of the dials 210 is shown as rotatable upon a shaft 212, which shaft is common to all of the dials. It is to be understood that the peripheral surface of each dial is numbered "0" through "9" and that the dials are interconnected by conventional mechanism in such a manner that one complete rotation of the units dial will impart one-tenth of a complete rotation to the tens dials, as is customary in an ordinary counter mechanism of this type. A mechanism typical of the type which may be used for this purpose is illustrated in the patent to C. W. Gooch, No. 1,128,679. A gear 213 is attached to one side of each dial 210 and meshes with a gear 214 mounted on a shaft 215. A pawl 216, pivoted to the side of the gear 214, is pressed by a spring 217 into engagement with an internal star gear 218. The star gear 218 is also rotatable on the shaft 215, but is fixed to a gear 219 on said shaft (see Figs. 11 and 13) for rotation therewith. The gear 219 is meshed with an arcuate rack 220 carried by the end of an elongated arm 221 which is pivotally supported on a shaft 222. Consequently, downward swinging movement of the arm 221 about the shaft 222 carries the arcuate rack 220 downwardly and rotates the gear 219 and the internal star gear 218 secured thereto. This rotation of the star gear 218 is clockwise, as viewed in Fig. 14, so that the teeth of the star gear ride over the pawl 216 without imparting motion to the gear 214. Upon return movement of the arm 221, however, the pawl 216 will engage with the star gear and impart rotation to the gear 214 and, through gear 213, to the dial 210, the degress of rotation imparted to the dial 210 depending therefore upon the distance that the arm 221 has been moved. It is to be noted that the star gear 218 has ten points within which the pawl 216 may engage so that any movement imparted through this mechanism to the dial 210 will result in stopping the dial with one of its ten numbers centrally positioned with relation to the sight opening in the casing through which the dial is viewed.

Referring particularly to Fig. 13 which shows in perspective that part of the mechanism illustrated in Figs. 9, 10 and 11 necessary to register the value "3" in the tens dial of the accumulator, the arm 221 is illustrated as rotatable on the shaft 222 but normally held upwardly with its outermost end in engagement with a cross member 223 by a spring 224 connected at one end to a downwardly extending finger 225 of the arm 221, and at the other end to a fixed bracket 226. Energization of an electromagnet N—2, which is one of a group of similar magnets N—1 to N—4 (see Figs. 9 and 10) draws the armature 227 of said magnet downwardly, which carries with it a finger 228 which in turn imparts downward movement to a link 229. The lower end of link 229 embraces a latch 230, which is pivoted at one end to the downwardly extending finger 225 of the arm 221, and which is provided with a latch lug 231 at its opposite end. Beneath the latch 230 a bar 232 is mounted for swinging movement on links 233 supporting it at its opposite ends and pivoted to a shaft 234. This bar 232 may be swung rearwardly through energization of a solenoid P having its armature 235 connected to the bar 232 by means of a spring 236. Thus, with the electromagnet N—2 energized just prior to energization of the solenoid P, the latch 230 will be lowered to a position with its latch lug 231 engageable by the bar 232 which, upon rearward swinging movement, will draw the latch with it and, through the finger 225, will impart downward swinging movement to the arm 221 about its pivotal support 222 and against the tension of the spring 224. The tension of spring 236 is greater than that of spring 224 so that spring 236 will be ineffective until the bar 221 is brought to a stop, at which time the resiliency of spring 236 permits a complete operation of the solenoid P, which includes full retraction of the plunger 235. The spring 236 may be dispensed with if the solenoid P is actuated by direct current, but is necessary in case alternating current is used. The spring is to be desired in all cases, however, for obtaining quiet action.

Unless interrupted in its movement, the arm 221 will be actuated by the solenoid P through the limit of its stroke, causing the dial with which it is associated to register the value "9". In order to limit the movement of the arm 221 to a degree less than its full stroke and thereby register a value smaller than "9" on the dial, the following mechanism is employed: Referring to Fig. 13, a stop mechanism for limiting the movement of the arm 221 is shown in the form of a vertical bar 240 positioned alongside the arm 221 and having a laterally projecting lug 241 adapted to underlie the bar 221 and limit its downward movement. The lower end of the bar 240 projects through a slot 242 in the bracket 226, and intermediate its ends a stationary transverse shaft 243 projects through an elongated vertically extending slot 244. A compression spring 245 interposed between the bracket 226 and the lug 241 normally urges the bar 240 upwardly until the bottom end of the slot 244 is in engagement with the bar 243. The bar 240 is one of a set of similar bars arranged in alignment alongside the arm 221, as shown in Fig. 11, and an identical set of bars is provided for each of the arms 221, of which there are four in the present illustration, as is shown in Fig. 12. The normal position of the bar 240 is at a slight angle to the vertical so that the lug 241 thereon will not interfere with downward movement of the arm 221. It is held in this position by engagement of its upper end with a slot 246 in a plate 247 which is connected by an arm 248 with the pivoted armature of an electromagnet M—3, one of a group of such magnets M—1 to M—9, inclusive, illustrated in Figs. 9 and 10. Energization of the electromagnet M—3 imparts longitudinal movement of the plate 247 to bring the bar 240 to a vertical position with the lug 241 thereon underlying the arm 221. Thus downward movement of the arm 221 is limited by the length of the slot 244, and as the length of slot 244 is progressively shorter in the bars 240 controlled by the electromagnets M—1 to M—8, respectively, selective energization of the magnets M—1 to M—9 will determine the magnitude of movement of the arm 221 and thereby determine the distance of rotation of the dial that is actuated by such movement. Energization of any one of the magnets M—1 to M—8 also causes the plate 247 moved thereby to engage a flexible arm 250 of a switch generally indicated at X—3, which is one of a group of switches X—1 to X—9 (see Fig. 9), thus closing the switch and completing the circuit therethrough to the solenoid P. Electromagnets M—1 to M—8 actuate respectively the first eight of said switches in the manner described, and electromagnet M—9 actuates switch X—9 similarly, except that a plain plate 252 is substituted in place of the notched plate 247, as in the entry of the value "9" into a dial there is a fixed limit for movement of the arm 221. The switches X—1 to X—9 are connected in parallel and, if desired, a single switch might be substituted for the nine switches, employing some suitable mechanism whereby energization of any one of the electromagnets M—1 to M—9 would close such a switch.

In the actual operation of the machine, the electromagnets N—2 is actuated to lower the latch 230, which will later effect operation of the arm 221, and the electromagnet M—3 is actuated to position the stop member 240, which limits the movement of the arm 221, and it is not until both of these preliminary operations have taken place that the electromagnet M—3 effects closing of the switch X—3 to complete a circuit to the solenoid P. Hence there is no possibility of the arm 221 being moved before all proper selections have been made. Through the structure just described, however, there is a minimum period of delay due to the fact that the same movement which places the stop 241 under the arm 221 effects closing of the switch to energize the solenoid P.

*Operation*

In operation of the machine, each digit of the multiplier which is entered on the multiplier key bank is combined with each digit of the multiplicand entered on the multiplicand key bank, and the product of multiplication is entered into the accumulator dials through the mechanism above described, the total sum of said products being obtained automatically through their entry cumulatively into the dials proper, regard being had for their entry in the units, tens, hundreds or thousands column. Thus an example of multiplication of the numbers "68" and "73" by the machine may be pictured somewhat as follows:

```
    68
    73
    ——
    24 is the product of 3×8
    18 is the product of 3×6
    56 is the product of 7×8
    42 is the product of 7×6
    ——
  4964 is the sum of said products
```

In the above problem, the first digit to be entered in the accumulator is the "4" of the product "24" in the units dial; second, the "8" of the product "18" is registered in the tens dial of the accumulator; third, the "6" of the product "56" is registered in the tens dial; fourth, the "2" of the product "42" is registered in the hundreds dial; fifth, the "2" of the product "24" is registered in the tens dial; sixth, the "1" of the product "18" is registered in the hundreds dial; seventh, the "5" of the product "56" is registered in the hundreds dial; and eighth, the "4" of the product "42" is registered in the thousands dial. Thus, as the entry of these values into the dials is, as aforesaid, cumulative, the dials will move to the following positions respectively upon completion of each of the above entries:

```
0004
0084
0144
0344
0364
0464
0964
4964
``` the last being the product of "68" and "73".

In the example given above, in order that the "4" of the partial product "24" be registered in the units dial, the electromagnet N—1 must be energized to insure operation of the units dial, and the electromagnet M—4 must be energized to limit the movement of said dial to the equivalent of the entry of the value "4" thereon. Likewise, to register the "8" of the partial product "18" into the tens dial, the electromagnet N—2 is energized to select the tens dial for operation, and electromagnet M—8 is energized to limit the movement of said dial to a distance corresponding to the value of "8". The same is true in each case, one of the magnets in the group N—1 to N—4 serving to select the proper dial, and one of the magnets in the group M—1 to M—9 serving to limit the rotation of the selected dial. The structural details of mechanism employed for transmission of a number from the units dial to the tens dial, and so on, and the specific mechanism for locking the dials when they are not in operation and for preventing otherthrow upon rotation of the dials, are not disclosed herein as they form no part of the present invention and constitute conventional mechanism, many forms of which are well-known in the art. Such a mechanism is illustrated in the patent to C. W. Gooch, No. 1,128,679, hereinabove referred to.

To exemplify the interconnection of the above-described mechanism by electrical circuits, the example of multiplication used above will be described in connection with the wiring diagram of Figs. 1 and 2. Electrical current from a suitable source is supplied to the machine through wires 50 and 100. One side of each of the electromagnets hereinafter referred to is permanently connected with the wire 50, and energization of any of these magnets occurs upon completion of a circuit between the opposite side of the electromagnet and the wire 100. To simplify the following description, all principal wires leading from the wires 50 and 100 will be identically numbered respectively. The first step preparatory to the operation of the machine will be the depression of the keys corresponding to "73" on the A or multiplier key bank, and depression of the keys corresponding to "68" on the B or multiplicand key bank, thus selecting the circuits controlled by these four keys, which circuits will later be closed in a proper predetermined sequence. The initial part of the rotary movement of the hand crank H will, as described in connection with Figs. 3 and 4, effect closing of switch S—1 of the selector switch E, and at the same time operate reversing switch C to disconnect wires 81 to 89 which lead to the relay unit from wire 100 and establish a connection between wire 100 and wires 111 to 119, inclusive, which lead to electromagnets M—1 to M—9 in the accumulator.

*Registration of the digit 4 of the partial product 24 (3×8)*

Closing of the switch S—1 connects wire 100 from the source of electrical supply with wires 101, 102 and 105. Wire 105 thereupon transmits current to electromagnet N—1 in the relay unit and thus the unit of the accumulator is selected for the entry of the first digit. Wire 101 leads to the units column of key bank A and thereby transmits current through the key switch which has been closed by depression of key "3" to wire 63 leading to the relay unit and to relay A—3, said unit actuating relay A—3 to close the nine switches controlled thereby. Referring again to switch S—1, wire 100 has also been connected thereby with wire 102 so that current flows through wire 102 to the unit column of key bank B and through the closed key switch "3" thereof, the wire 58 leading to the relay unit and energizing relay B—8 to effect closing of the eight switches controlled thereby. As the reversing switch D is in its normal position, wire 100 is connected thereby with wires 70 to 78, inclusive, which lead to the relay unit. Thus with relay switches B—8 and A—3 closed, current from wire 100 will flow through switch D to wire 72, and thence through relay B—8 to wire 15, through wire 15 to relay switch A—3, which completes a circuit to wire 84. The wire 15 just referred to is one of a group of wires 1 to 45, inclusive, which serve, as illustrated in Fig. 2, to form connections between the group of relay switches A—1 to A—9 and the group of relay switches B—1 to B—9.

Wire 84 leads back to the control unit and through switch C connects with wire 114 leading to electromagnet M—4, thus completing a circuit to and actuating said magnet. The actuation of electromagnet M—4, which has been described in connection with Figs. 11 to 14, prepares the accumulator for the registration of the value "4" upon any dial which is actuated, in this case the units dial, and then closes switch X—4, to complete a circuit from wire 100 on one side of said switch to wire 120 leading to solenoid P, thus energizing said solenoid. Since electromagnet N—1 has already effected selection of the units dial, and electromagnet M—4 has established a limit to the rotation of said dial, the result will be rotation of the units dial until the digit "4" appears thereon.

The progressive rotation of the operating crank H now causes release of the switch S—1, which returns to its normal position, breaking the circuit to the solenoid P as well as to the electromagnets N—1 and M—4 in the accumulator unit and relays A—3 and B—8 in the relay unit.

*Registration of the digit 8 of the partial product 18 (3×6)*

Continued rotation of the hand crank H now effects closing of switch S—2, which serves to connect wire 100 with wires 101, 104 and 106. Wire 106 leads to and thus energizes electromagnet N—2, which effects selection of the tens dial in the accumulator. Wire 101, which leads to the units column in key bank A, transmits current through closed key switch "3" in said column, and thence through wire 63 to relay A—3 in the relay unit, actuating said relay to close its nine switches. Referring back to selector switch S—2, wire 104 leads to the tens column in key bank B, causing current to flow through closed key switch "6" in said column, and through wire 56 to relay B—6, which effects closing of the six relay switches controlled thereby. As reversing switch D is still in its normal position, the wire 100 is still connected thereby to wires 70 to 78, and reversing switch C continues to form connections between wires 81 to 89 and 111 to 119, respectively. Consequently, relay switches B—6 and A—3 having been closed, current flows from wire 100 through switch D to wire 171, and thence through relay B—6 to wire 29 which, by reason of relay A—3 being closed, transmits current through relay A—3 to wire 88 leading back through switch C to wire 118 which connects with electromagnet M—8 to energize the same. Actuation of electromagnet M—8 prepares the accumulator for the registration of the value "8" upon whichever dial may have been selected, in this case the tens dial having been selected by electromagnet N—2. Electromagnet M—8 also closes switch X—8 to energize solenoid P which, upon operation, effects registration of the value "8" upon the tens dial of the accumulator.

Again the progressive movement of the hand crank H effects release of the switch S—2, which returns to its normal open position, thus de-energizing the solenoid P, the electromagnets N—2, M—8, and the relays A—3 and B—6, all of which return to their normal position.

*Registration of the digit 6 of the partial product 56 (7×8)*

The next selector switch to be closed is S—3, which serves to conect wire 100 with wires 102, 103 and 106. Wire 106 again energizes electromagnet N—2 to select the tens dial. Wire 103 leads to the tens column of key bank A and through key switch "7" in said column to wire 67, which completes a circuit to relay A—7. Wire 102 leads from selector switch S—3 to the units column in key bank B through key switch "8" in the units column and thence through wire 58 to relay B—8. Reversing switch D still remains in its normal position so that upon closing of the relay switch A—7 and B—8, current will flow from wire 100 through switch D to wire 75 and thence through relay switch B—8 to wire 12 leading to relay switch A—7 which now serves to connect wire 12 to wire 86, which is connected through switch C with wire 116 leading to electromagnet M—6. Now with N—2 and M—6 both energized, actuation of solenoid P will effect entry of the value "6" upon the tens dial of the accumulator. It should be understood that, as the value "8" has already been entered on the tens dial, the value "6" will be cumulative, the accumulated values entered upon the tens dial now totaling "14." Thus the number "4" will appear on the tens dial, and the number "1" on the hundreds dial.

At the completion of this operation, the switch S—3 again opens, de-eenergizing all of the electromagnets energized by its closing, and the machine is ready for the next part of its operation.

Registration of the digit 2 of the partial product 42 (7×6)

Selector switch S—4 now closes, connecting wire 100 with wires 103, 104 and 107. Wire 107 transmits current to electromagnet N—3 to effect selection of the hundreds dial of the accumulator for operation. Wire 103 leads to closed key switch number "7" in the tens column of the A key bank, and through said switch to wire 67 and relay A—7. Wire 104 leads from selector switch S—4 to key switch number "6" in the tens column of key bank B and through said switch to wire 56 and thence to relay B—6. Reversing switch D is still in the position connecting wire 100 to wires 70 to 78, while reversing switch C remains in the position connecting wires 81 to 89 with wires 111 to 119. Now therefore the current flow from wire 100 may be traced through switch D to wire 74, and from wire 74 through relay B—6 to wire 27 leading to relay A—7, which forms a connection with wire 82 leading to switch C and, through switch C, with wire 112 leading in turn to electromagnet M—2. The actuation of electromagnet M—2 prepares the accumulator for the entry of the value "2" into the hundreds dial, which dial has already been selected by the electromagnet N—3 so that upon closing of the switch X—2, which will occur in the same manner described in connection with the other operations, the solenoid P will be energized to operate the accumulator mechanism.

At this point, further rotation of the hand crank H opens the switch S—4 to de-energize the solenoid P, the electromagnets N—3, M—2 and the relays A—7 and B—6, all of which return to their normal position.

Now the first half of the operation is complete; that is to say, the machine has gone through the four operations necessary to produce the four partial products of the example given above, but in each case the right-hand figure of the partial product, that is, the "4", "8", "6" and "2", is the only figure entered into the accumulator dials. During the second half of the operation of the machine, the same general operation will transpire, except that in each case the left-hand digits of the partial products will be entered into the accumulator dials, each in its proper position; that is, the second half of the operation will comprise the entry of the values "2", "1", "5" and "4". The principal change in the arrangement of the electrical circuits, in order to make possible the next four operations of the machine, is that the positions of the reversing switches C and D are reversed. Mechanically, this is effected by the cam 186 of Fig. 4 which, upon the second half of its rotation, permits the bar 181 of the reversing switch C to drop and simultaneously engages and moves downwardly the bar 185 of the reversing switch D. The effect of this, as illustrated in the wiring diagram of Fig. 1, will be to break the connection at switch C between wires 81 to 89 and wires 111 to 119, respectively, and establish connection between the wire 100 and wires 81 to 89. At switch D the connection will be broken between wire 100 and wires 71 to 78, and connections will be established between wires 71 to 78 and wires 111 to 118, respectively.

Registration of the digit 2 of the partial product 24 (3×8)

The selector switch S—5 is closed upon the first part of the second half-cycle of operation of the crank H and, in being closed, connects wire 100 with wires 101, 102 and 106. Wire 106 therefore effects energization of electromagnet N—2 to select the tens dial of the accumulator. Current flows through wire 101 across key switch number "3" in the units column of key bank A through wire 63, which leads to relay A—3 to close the switches controlled thereby. Current likewise flows through wire 102 across key switch number "8" in the units column of key bank B to wire 58, and to relay B—8, thus closing its switches. Now, due to the new position of reversing switches C and D, current will flow through wire 100, through switch C to wire 84, and by way of closed relay A—3 to wire 15 leading to closed relay B—8. Relay switch B—8 forms a connection between wire 15 and wire 72 which, through switch D, is now connected with wire 112 leading to electromagnet M—2. Thus with N—2 and M—2 actuated, and solenoid P actuated in the usual manner, the value "2" will be entered on the tens dial of the accumulator, and switch S—5 will open to de-energize all relays and electromagnets in the customary manner.

Registration of the digit 1 of the partial product 18 (3×6)

Selector switch S—6 is the next to be closed and, upon being closed, connects wire 100 with wires 101, 104 and 107. Wire 107 energizes electromagnet N—3 to select the hundreds dial of the accumulator. Wire 101 completes a circuit through key switch "3" in the units column of key bank A and through wire 63 to actuate relay A—3 and close the switches controlled thereby. Similarly, wire 104 completes a circuit through key switch "6" in the tens column of the B key bank to wire 56 leading to relay B—6, which is actuated to close the switches controlled by it. With relay switches A—3 and B—6 closed, and reversing switches C and D in the same position as for the last operation, current will flow from wire 100 through switch C to wire 88 and thence through relay A—3 to wire 29 leading to relay B—6, and through said relay switch to wire 71, which connects through switch D with wire 111 leading to electromagnet M—1. Thus electromagnets N—3 and M—1 have been selected for entry of the value "1" into the hundreds dial of the accumulator, and immediately after operation of the solenoid P to complete this entry, the switch S—6 is opened.

Registration of the digit 5 of the partial product 56 (7×8)

The selector switch S—7 now closes to connect wire 100 with wires 102, 103 and 107. Wire 107 again actuates electromagnet N—3 to select the hundreds dial of the accumulator. Wire 103 leads through key switch "7" in the tens column of key bank A to wire 67 and to relay A—7. Likewise, wire 102 leads through key switch "8" in the units column of key bank B to wire 58, and through wire 58 to relay B—8. Now with relay switches A—7 and B—8 closed, current flows from wire 100 through switch C to wire 86, thence through relay A—7 to wire 12 which leads to relay B—8 and connects therethrough with wire 75. Wire 75 returns through switch D to wire 115 leading to electromagnet M—5. Thus with electromagnets N—3 and M—5 energized, actuation of solenoid P will effect entry of the value "5" in the hundreds dial of the accumulator, and the circuits are again broken by the opening of switch S—7.

*Registration of the digit 4 of the partial product 42 (7×6)*

Selector switch S—8 now closes to establish a connection between wire 100 and wires 103, 104 and 108. Wire 108 leads to and energizes electromagnet N—4, thus selecting the thousands dial in the accumulator. Wire 103 transmits current through closed key switch number "7" in the tens column of the A key bank to wire 67 and to relay A—7. Wire 104 likewise transmits current through closed key switch number "6" in the tens column of the B key bank to wire 56 and relay B—6. Thus with the switches controlled by relays A—7 and B—6 closed, the current from wire 100 flows through reversing switch C to wire 82 and through wire 82 to relay A—7 which establishes a connection with wire 27 leading to relay B—6, and from relay B—6 current passes back through wire 74 to switch D, which connects wire 74 with wire 114 leading to and energizing electromagnet M—4. Now with electromagnets N—4 and M—4 closed, the solenoid P is actuated in the usual manner to enter the value "4" in the thousands dial of the accumulator.

The completion of the full cycle of operation of the hand crank H effects opening of the switch S—8 and return of reversing switches C and D to their original position so that the machine is again in readiness for the entry on the key banks thereof of a new problem.

As each digit of the partial products of the multiplication problem taken as an example has been entered into the accumulator dials with proper respect to the column in which it should appear, and as the entry of these digits has been cumulative, the total sum of these products, "4964", which is the final product of the multiplication of "68" and "73", is presented to view on the accumulator dials through the sight openings provided for this purpose.

Having thus described my invention, what I claim and desire to secure by Letters Patent is—

1. In a calculating machine, means for controlling entry of successive partial products on a series of accumulator wheels, said means consisting of eighteen multiple contact relays, nine of which control the closure of nine electric contacts and nine of which control the closure of one to nine contacts, respectively, said multicontact relays being controlled nine by a multiplicand key bank and nine by a multiplier key bank, circuits interconnecting said contacts and reversing switches in said circuits for controlling the operation of the accumulator wheels jointly with said relays to cause the entry upon said wheels of partial products of the values set up on said key banks, the right and left-hand components of said products being entered separately under control of said circuits depending on the setting of said reversing switches.

2. In a calculating machine of the character described having accumulating means, means including electric circuits for actuating the accumulating means, a bank of nine switches in said circuits having nine contacts each, a second bank of nine switches in said circuits having progressively one to nine contacts each, and reversing switches for controlling said circuits whereby said circuits cause operation of said actuating means to accumulate successively right-hand and left-hand components of partial products of values corresponding to closed switches in said banks depending on the setting of the reversing switches.

EUGENE R. BOOKER.